L. W. SCHMIDT.
ARMORED AUTOMOBILE.
APPLICATION FILED APR. 23, 1919.
1,317,323.
Patented Sept. 30, 1919.
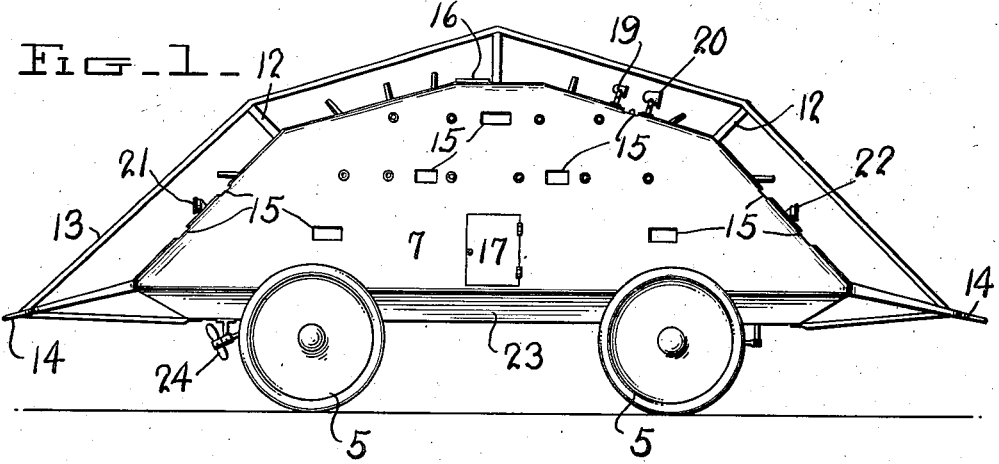
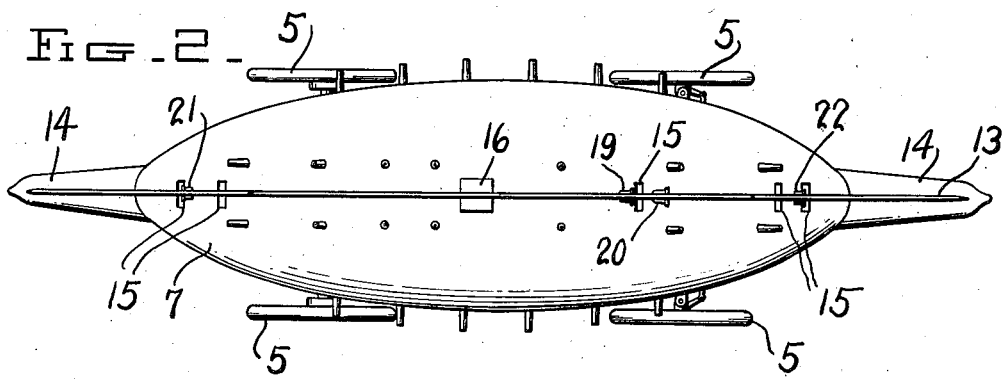
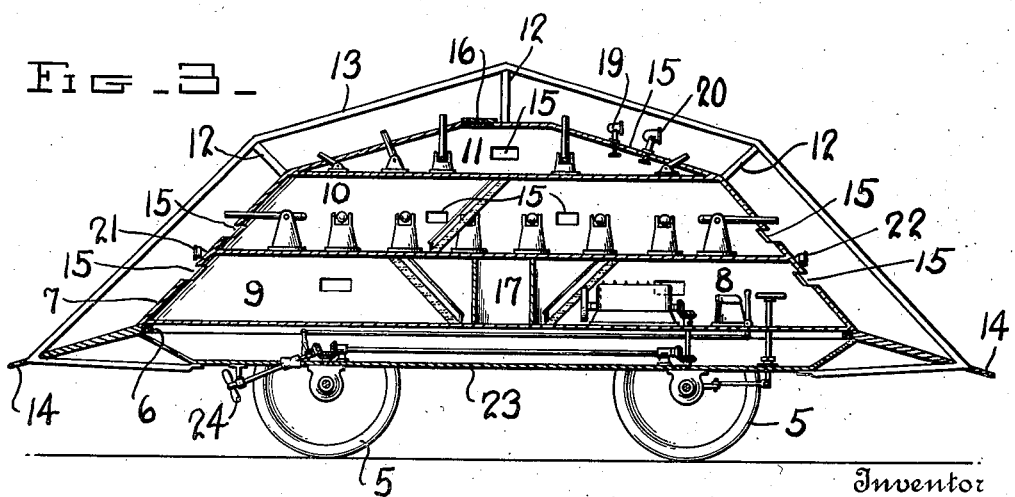
Inventor
Lewis W. Schmidt
By
Attorney

UNITED STATES PATENT OFFICE.

LEWIS W. SCHMIDT, OF SCHENECTADY, NEW YORK.

ARMORED AUTOMOBILE.

1,317,323.  Specification of Letters Patent.  Patented Sept. 30, 1919.

Application filed April 23, 1919. Serial No. 292,011.

*To all whom it may concern:*

Be it known that I, LEWIS W. SCHMIDT, a citizen of the United States, residing at Schenectady, in the county of Schenectady and State of New York, have invented certain new and useful Improvements in Armored Automobiles, of which the following is a specification.

This invention relates to automobiles and more particularly to armored automobiles.

The primary object of this invention resides in the provision of an armored automobile for offensive campaigns in war.

Another object of this invention resides in the provision of an armored automobile consisting of an association of weapons for destroying the enemy defenses as it progresses.

A still further object of this invention resides in the provision of an armored automobile consisting of various compartments for the accommodation of the crew.

With these and other objects in view this invention resides in certain novel features of construction and arrangement of elements to be more particularly set forth in the specification herewith and pointed out in the appended claim, it being understood that the right is reserved to resort to such changes in construction as come within the scope of the claim.

In the accompanying drawings:—

Figure 1 is a side view of an armored automobile as constructed in accordance with this invention;

Fig. 2 is a plan view thereof;

Fig. 3 is a longitudinal vertical sectional view of the armored automobile.

In the present embodiment of this invention, the numeral 5 designates traction wheels of any approved design which support a chassis 6.

Mounted on the chassis 6 is an armored body 7 the interior of which is divided into an engine room 8, the supply room 9 and upper and lower parapets 10 and 11 for the accommodation of various caliber guns to combat with either land or aerial defenses.

Secured to the top of the body is a plurality of outwardly directed standards 12 which retain a wire cutting blade 13 in position to destroy wire entanglements as the machine encounters the same. The forward and rear ends of the machine are provided with rams 14 to which the cutting blades are fastened.

The aforesaid cutting blades are adapted to extend beneath the rams 14 and above the body of the automobile so that they will wedge their way through the wire entanglements and readily clear a passage therethrough.

The armored walls of the automobile are provided with suitable observation holes 15 and also with a trap door 16 at the top and other doors 17 between the engine and supply rooms for the entrance of the crew and supplies to the interior of the automobile. The observation holes are preferably provided with suitable shutters which can readily be adjusted to prevent the entrance of projectiles to the interior of the parapets.

The various guns are mounted in the parapets with their muzzles projecting a sufficient distance on the exterior to readily accomplish the purpose for which they are designed.

Adjacent the forward end of the upper parapet is a signal lamp 19 and a search light 20 which are manipulated from the interior of the aforesaid parapet.

The forward and rear ends of the automobile are provided with suitable traffic lamps 21 and 22 for the usual purpose.

In the engine room of this automobile is a motor which is adapted to transmit power to the forward and rear wheels to enable the automobile to progress over the most rugged roads.

This automobile is provided with a water tight bottom 23 in the form of a boat to permit it to advance through water when the propeller 24 is rotated by the usual transmission mechanism herein disclosed in a conventional manner.

With this invention fully set forth it is manifest that an offensive automobile is produced which will readily disperse the enemy and make it possible for the advancement of the infantry.

Having thus described my invention what I claim is:—

In combination in a device of the character described, an armored body having a bottom in the form of a boat, of traction wheels secured to said body, the interior of said body being divided into adjacent engine and supply rooms, and lower parapets, guns mounted on said parapets, a plurality of outwardly directed standards secured to the top of said body, a wire cutting blade held to said standards and a ram extending from the end of said body, said cutting blade extending beneath said ram and above said body whereby said blade will wedge its way through certain entanglements, all arranged as and for the purpose set forth.

In testimony whereof I affix my signature.

LEWIS W. SCHMIDT.